(12) United States Patent
Aziz et al.

(10) Patent No.: US 10,757,120 B1
(45) Date of Patent: *Aug. 25, 2020

(54) MALICIOUS NETWORK CONTENT DETECTION

(71) Applicant: FireEye, Inc., Milpitas, CA (US)

(72) Inventors: Ashar Aziz, Coral Gables, FL (US); Henry Uyeno, Sunnyvale, CA (US); Jay Manni, San Jose, CA (US); Amin Sukhera, Fremont, CA (US); Stuart Staniford, San Francisco, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/036,870

(22) Filed: Jul. 16, 2018

Related U.S. Application Data

(63) Continuation of application No. 14/745,903, filed on Jun. 22, 2015, now Pat. No. 10,027,690, which is a
(Continued)

(51) Int. Cl.
*G06F 12/14* (2006.01)
*H04L 29/06* (2006.01)
(Continued)

(52) U.S. Cl.
CPC .......... *H04L 63/1416* (2013.01); *G06F 21/56* (2013.01); *G06F 21/562* (2013.01);
(Continued)

(58) Field of Classification Search
None
See application file for complete search history.

(56) References Cited

U.S. PATENT DOCUMENTS

| 4,292,580 A | 9/1981 | Ott et al. |
| 5,175,732 A | 12/1992 | Hendel et al. |

(Continued)

FOREIGN PATENT DOCUMENTS

| GB | 2439806 A | 1/2008 |
| GB | 2490431 A | 10/2012 |

(Continued)

OTHER PUBLICATIONS

Kristoff, J. , "Botnets, Detection and Mitigation: DNS-Based Techniques", NU Security Day, (2005), 23 pages.
(Continued)

*Primary Examiner* — Brandon S Hoffman
(74) *Attorney, Agent, or Firm* — Rutan & Tucker, LLP

(57) ABSTRACT

An electronic message is analyzed for malware contained in the message. Text of an electronic message may be analyzed to detect and process malware content in the electronic message itself. The present technology may analyze an electronic message and attachments to electronic messages to detect a uniform resource location (URL), identify whether the URL is suspicious, and analyze all suspicious URLs to determine if they are malware. The analysis may include re-playing the suspicious URL in a virtual environment which simulates the intended computing device to receive the electronic message. If the re-played URL is determined to be malicious, the malicious URL is added to a black list which is updated throughout the computer system.

38 Claims, 8 Drawing Sheets

Related U.S. Application Data continuation of application No. 13/089,191, filed on Apr. 18, 2011, now Pat. No. 9,106,694, which is a continuation of application No. 11/717,474, filed on Mar. 12, 2007, now Pat. No. 8,898,788, which is a continuation-in-part of application No. 11/494,990, filed on Jul. 28, 2006, now Pat. No. 8,375,444, which is a continuation-in-part of application No. 11/471,072, filed on Jun. 19, 2006, now Pat. No. 8,584,239, which is a continuation-in-part of application No. 11/409,355, filed on Apr. 20, 2006, now Pat. No. 8,171,553, which is a continuation-in-part of application No. 11/096,287, filed on Mar. 31, 2005, now Pat. No. 8,528,086, and a continuation-in-part of application No. 11/151,812, filed on Jun. 13, 2005, now Pat. No. 8,549,638, and a continuation-in-part of application No. 11/152,286, filed on Jun. 13, 2005, now Pat. No. 8,006,305.

(60) Provisional application No. 60/559,198, filed on Apr. 1, 2004, provisional application No. 60/579,953, filed on Jun. 14, 2004, provisional application No. 60/579,910, filed on Jun. 14, 2004.

(51) Int. Cl.
*H04L 12/58* (2006.01)
*G06F 21/56* (2013.01)

(52) U.S. Cl.
CPC ............ *H04L 51/12* (2013.01); *H04L 63/145* (2013.01); *H04L 63/168* (2013.01)

(56) References Cited

U.S. PATENT DOCUMENTS

| | | |
|---|---|---|
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,251,215 B1 | 7/2007 | Turner et al. |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,516,488 B1 | 4/2009 | Kienzle et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |

(56) References Cited

U.S. PATENT DOCUMENTS

| | | |
|---|---|---|
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shifter et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shifter et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |

(56) References Cited

U.S. PATENT DOCUMENTS

| | | |
|---|---|---|
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |

(56) References Cited

U.S. PATENT DOCUMENTS

| | | |
|---|---|---|
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222728 A1 | 9/2008 | Chavez et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1* | 3/2010 | Polyakov .............. G06F 21/552 726/24 |
| 2010/0083376 A1 | 4/2010 | Pereira et al. |
| 2010/0100718 A1 | 4/2010 | Srinivasan |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1* | 11/2010 | Chinta ................ G06F 21/53 709/203 |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |

(56) References Cited

U.S. PATENT DOCUMENTS

| | | |
|---|---|---|
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gable et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| JP | 2003-256469 A | 9/2003 |
| JP | 2004-240945 A | 8/2004 |
| JP | 2005-056048 A | 3/2005 |
| WO | 0206928 A2 | 1/2002 |
| WO | 02/23805 A2 | 3/2002 |
| WO | 2007/022454 A2 | 2/2007 |
| WO | 2007117636 A2 | 10/2007 |
| WO | 2008041950 A2 | 4/2008 |
| WO | 2008/084259 A1 | 7/2008 |
| WO | 2011084431 A2 | 7/2011 |
| WO | 2011/112348 A1 | 9/2011 |
| WO | 2012/075336 A1 | 6/2012 |

(56) References Cited

FOREIGN PATENT DOCUMENTS

| WO | 2012145066 A1 | 10/2012 |
|---|---|---|
| WO | 2013/067505 A1 | 5/2013 |

OTHER PUBLICATIONS

Leading Colleges Select FireEye to Stop Malware-Related Data Breaches, FireEye Inc., 2009.

Li et al., A VMM-Based System Call Interposition Framework for Program Monitoring, Dec. 2010, IEEE 16th International Conference on Parallel and Distributed Systems, pp. 706-711.

Liljenstam, Michael, et al., "Simulating Realistic Network Traffic for Worm Warning System Design and Testing", Institute for Security Technology studies, Dartmouth College ("Liljenstam"), (Oct. 27, 2003).

Lindorfer, Martina, Clemens Kolbitsch, and Paolo Milani Comparetti. "Detecting environment-sensitive malware." Recent Advances in Intrusion Detection. Springer Berlin Heidelberg, 2011.

Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].

Marchette, David J., "Computer Intrusion Detection and Network Monitoring: A Statistical Viewpoint", ("Marchette"), (2001).

Margolis, P.E., "Random House Webster's 'Computer & Internet Dictionary 3rd Edition'", ISBN 0375703519, (Dec. 1998).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Newsome, J., et al., "Polygraph: Automatically Generating Signatures for Polymorphic Worms", In Proceedings of the IEEE Symposium on Security and Privacy, (May 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.--N-Version Antivirus in the Network Cloud, 17th USENIX Security Symposium USENIX Security '08 Jul. 28-Aug. 1, 2008 San Jose, CA.

PCT/US2012/021916 filed Jan. 19, 2012, International Search Report and Written Opinion dated May 10, 2012.

PCT/US2012/026402 filed Feb. 23, 2012 International Search Report and Written Opinion dated May 25, 2012.

Rautiainen et al., "A look at Portable Document Format Vulnerabilities", Information Security Technical Report, Elsevier Advanced Technology, Amsterdam, NL, vol. 14, No. 1, Feb. 1, 2009.

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Spitzner, Lance, "Honeypots: Tracking Hackers", ("Spizner"), (Sep. 17, 2002).

The Sniffers's Guide to Raw Traffic available at: yuba.stanford.edu/.about.casado/pcap/section1.html, (Jan. 6, 2014).

Thomas H. Ptacek, and Timothy N. Newsham, "Insertion, Evasion, and Denial of Service: Eluding Network Intrusion Detection", Secure Networks, ("Ptacek"), (Jan. 1998).

U.S. Appl. No. 13/089,191, filed Apr. 18, 2011 Non-Final Office Action dated Feb. 13, 2013.

U.S. Pat. No. 8,171,553 filed Apr. 20, 2006, Inter Parties Review Decision dated Jul. 10, 2015.

U.S. Pat. No. 8,291,499 filed Mar. 16, 2012, Inter Parties Review Decision dated Jul. 10, 2015.

Venezia, Paul, "NetDetector Captures Intrusions", InfoWorld Issue 27, ("Venezia"), (Jul. 14, 2003).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

"Network Security: NetDetector—Network Intrusion Forensic System (NIFS) Whitepaper", ("NetDetector Whitepaper"), (2003).

"Packet", Microsoft Computer Dictionary, Microsoft Press, (Mar. 2002), 1 page.

"When Virtual is Better Than Real", IEEEXplore Digital Library, available at, http://ieeexplore.ieee.org/xpl/articleDetails.sp?reload=true&amumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye"), (Sep. 2003).

Adobe, "Inside Adobe Reader Protected Mode--Part 1--Design", Oct. 5, 2010, Retrieved from Internet: URL:http//blogs.adobe.com/security/2010/10/inside-adobe-reader-protected—mode-part-1-design.html [retrieved on May 6, 2014].

AltaVista Advanced Search Results. "attack vector identifier". Http://www.altavista.com/web/results?ltag=ody&pg=aq&aqmode=aqa=Event+Orch- estrator . . . , (Accessed on Sep. 15, 2009).

AltaVista Advanced Search Results. "Event Orchestrator". Http://www.altavista.com/webiresults?ltag=ody&pg=aq&aqmode=aqa=Event+Orch- esrator , (Accessed on Sep. 3, 2009).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.

Bayer, et al., "Dynamic Analysis of Malicious Code", J Comput Virol, Springer-Verlag, France., (2006), pp. 67-77.

(56) References Cited

OTHER PUBLICATIONS

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cisco, Configuring the Catalyst Switched Port Analyzer (SPAN) ("Cisco"), (1992).
Clark, John, Sylvian Leblanc,and Scott Knight. "Risks associated with usb hardware trojan devices used by insiders." Systems Conference (SysCon), 2011 IEEE International. IEEE, 2011.
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Crandall, J.R. , et al., "Minos:Control Data Attack Prevention Orthogonal to Memory Model", 37th International Symposium on Microarchitecture, Portland, Oregon, (Dec. 2004).
Deutsch, P. , "Zlib compressed data format specification version 3.3" RFC 1950, (1996).
Didier Stevens, "Malicious PDF Documents Explained", Security & Privacy, IEEE, IEEE Service Center, Los Alamitos, CA, US, vol. 9, No. 1, Jan. 1, 2011.
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
EP 12774315.1 filed Oct. 23, 2013 Decision of Refusal dated Nov. 10, 2017.
EP 12774315.1 filed Oct. 23, 2013 Minutes of Oral Proceedings dated Sep. 21, 2017.
EP 12774315.1 filed Oct. 23, 2013 Office Action dated Oct. 7, 2015.
EP 12774315.1 filed Oct. 23, 2013 Summons to Oral Proceedings dated Sep. 23, 2016.
Excerpt regarding First Printing Date for Merike Kaeo, Designing Network Security ("Kaeo"), (2005).
Extended European Search Report dated Oct. 30, 2014, Application No. 127743151-1862/2700009, PCT/US2012026402.
Filiol, Eric , et al., "Combinatorial Optimisation of Worm Propagation on an Unknown Network", International Journal of Computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].
Heng Yin et al, Panorama: Capturing System-Wide Information Flow for Malware Detection and Analysis, Research Showcase © CMU, Carnegie Mellon University, 2007.
Hjelmvik, Erik , "Passive Network Security Analysis with NetworkMiner", (IN)Secure, Issue 18, (Oct. 2008), pp. 1-100.
Idika et al., A-Survey-of-Malware-Detection-Techniques, Feb. 2, 2007, Department of Computer Science, Purdue University.
IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King") (2003).
Krasnyansky, Max , et al., Universal TUN/TAP driver, available at https://www.kernel.org/doc/Documentation/networking/tuntap.txt (2002) ("Krasnyansky").
Kreibich, C. , et al., "Honeycomb-Creating Intrusion Detection Signatures Using Honeypots", 2nd Workshop on Hot Topics in Networks (HotNets-11), Boston, USA, (2003).
"Mining Specification of Malicious Behavior"--Jha et al, UCSB, Sep. 2007 https://www.cs.ucsb.edu/,about.chris/research/doc/esec07.sub.--mining.pdf-.
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Hiroshi Shinotsuka, Malware Authors Using New Techniques to Evade Automated Threat Analysis Systems, Oct. 26, 2012, http://www.symantec.com/connect/blogs/, pp. 1-4.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Lastline Labs, The Threat of Evasive Malware, Feb. 25, 2013, Lastline Labs, pp. 1-8.
U.S. Appl. No. 13/089,191, filed Apr. 18, 2011 Notice of Allowance dated Jul. 29, 2013.
U.S. Appl. No. 14/745,903, filed Jun. 22, 2015 Final Office Action dated Mar. 27, 2017.
U.S. Appl. No. 14/745,903, filed Jun. 22, 2015 Non-Final Office Action dated Oct. 12, 2016.
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

* cited by examiner

MALICIOUS NETWORK CONTENT DETECTION

CROSS REFERENCE TO RELATED APPLICATIONS

This document is a continuation application, claiming the benefit of, and priority through, U.S. patent application Ser. No. 14/745,903, filed Jun. 22, 2015, now U.S. patent Ser. No. 10/027,690, which is a continuation U.S. patent application Ser. No. 13/089,191, filed on Apr. 18, 2011, now U.S. Pat. No. 9,106,694; which is a continuation to U.S. patent application Ser. No. 11/717,474 filed on Mar. 12, 2007, now U.S. Pat. No. 8,898,788; U.S. patent application Ser. No. 11/494,990 filed on Jul. 28, 2006, now U.S. Pat. No. 8,375,444; U.S. patent application Ser. No. 11/417,072 filed on Jun. 19, 2006, now U.S. Pat. No. 8,584,239; U.S. patent application Ser. No. 11/409,355 filed on Apr. 20, 2006, now U.S. Pat. No. 8,171,553; U.S. patent application Ser. No. 11/151,812 filed on Jun. 13, 2005, now U.S. Pat. No. 8,549,638; U.S. patent application Ser. No. 11/152,286 filed on Jun. 13, 2005, now U.S. Pat. No. 8,006,305; U.S. patent application Ser. No. 11/096,287 filed Mar. 31, 2005, now U.S. Pat. No. 8,528,086; U.S. Provisional Patent Application No. 60/579,953; U.S. Provisional Patent Application No. 60/579,910; and U.S. Provisional Patent Application No. 60/559,198 filed on Apr. 1, 2004, all of which are hereby incorporated by reference in their entirety for all purposes.

BACKGROUND

Presently, malicious network content (e.g., malicious software or malware) can attack various devices via a communication network. For example, malware may include any program or file that is harmful to a computer user, such as bots, computer viruses, worms, Trojan horses, adware, spyware, or any programming that gathers information about a computer user or otherwise operates without permission.

Various processes and devices have been employed to prevent the problems that malicious network content can cause. For example, computers often include antivirus scanning software that scans a particular client device for viruses. Computers may also include spyware and/or adware scanning software. The scanning may be performed manually or based on a schedule specified by a user associated with the particular computer, a system administrator, and so forth. Unfortunately, by the time a virus or spyware is detected by the scanning software, some damage on the particular computer or loss of privacy may have already occurred. Additionally, it can take days or weeks for new Anti-Virus signatures to be manually created and for an anti-virus application to be updated, by which time malware authors will have already created new versions that evade the signatures. Moreover, polymorphic exploits are also an issue that limits the effectiveness of some anti-virus applications.

Malicious network content may be distributed over a network via web sites, e.g., servers operating on a network according to an HTTP standard. Malicious network content distributed in this manner may be actively downloaded and installed on a user's computer, without the approval or knowledge of the user, simply by accessing the web site hosting the malicious network content. The web site hosting the malicious network content may be referred to as a malicious web site. The malicious network content may be embedded within data associated with web pages hosted by the malicious web site. For example, a web page may include JavaScript code, and malicious network content may be embedded within the JavaScript code. In this example, the malicious network content embedded within the JavaScript code may be obfuscated such that it is not apparent until the JavaScript code is executed that the JavaScript code contains malicious network content. Therefore, the malicious network content may attack or infect a user's computer before detection by antivirus software, firewalls, intrusion detection systems, or the like.

Additionally, malicious network content may be distributed by electronic messages, including email, using such protocols as POP, SMTP, IMAP, and various forms of web-based email. Malicious content may be directly attached to the message (for example as a document capable of exploiting a document reading application, such as a malicious Microsoft Excel document). Alternatively, electronic messages may contain URL links to malicious content hosted on web servers elsewhere on the network. When target users click on such links, they may be infected from the web in the manner described above. These techniques for infecting user computers via electronic messages are often used to make targeted attacks on particular "high-value" users at organizations, such as executives or key technical or operational staff.

What is needed is an improved system for detecting malicious content propagated in electronic messages.

SUMMARY

The present technology analyzes an electronic message for malware contained in the message. Systems that analyze electronic messages typically analyze attached files for malware. The content of an electronic message itself may contain text, which is usually not examined by malware systems. The present technology analyzes text of an electronic message to detect and process malware content in the electronic message itself. In some embodiments, the present technology may analyze an electronic message to detect a uniform resource location (URL), identify whether the URL is suspicious, and analyze all suspicious URLs to determine if they are malware. The analysis may include re-playing the suspicious URL in a virtual environment which simulates the intended computing device to receive the electronic message. If the re-played URL is determined to be malicious, the malicious URL is added to a black list which is updated throughout the computer system.

In an embodiment, malicious network content may be detected by a network content processing system by receiving an electronic message. The electronic message may be determined to include content determined to be suspicious. The suspicious electronic message content may be executed in a virtual environment. The suspicious electronic message content may be identified as malicious based on execution of the suspicious electronic message content in the virtual environment.

DETAILED DESCRIPTION

Figure 1:
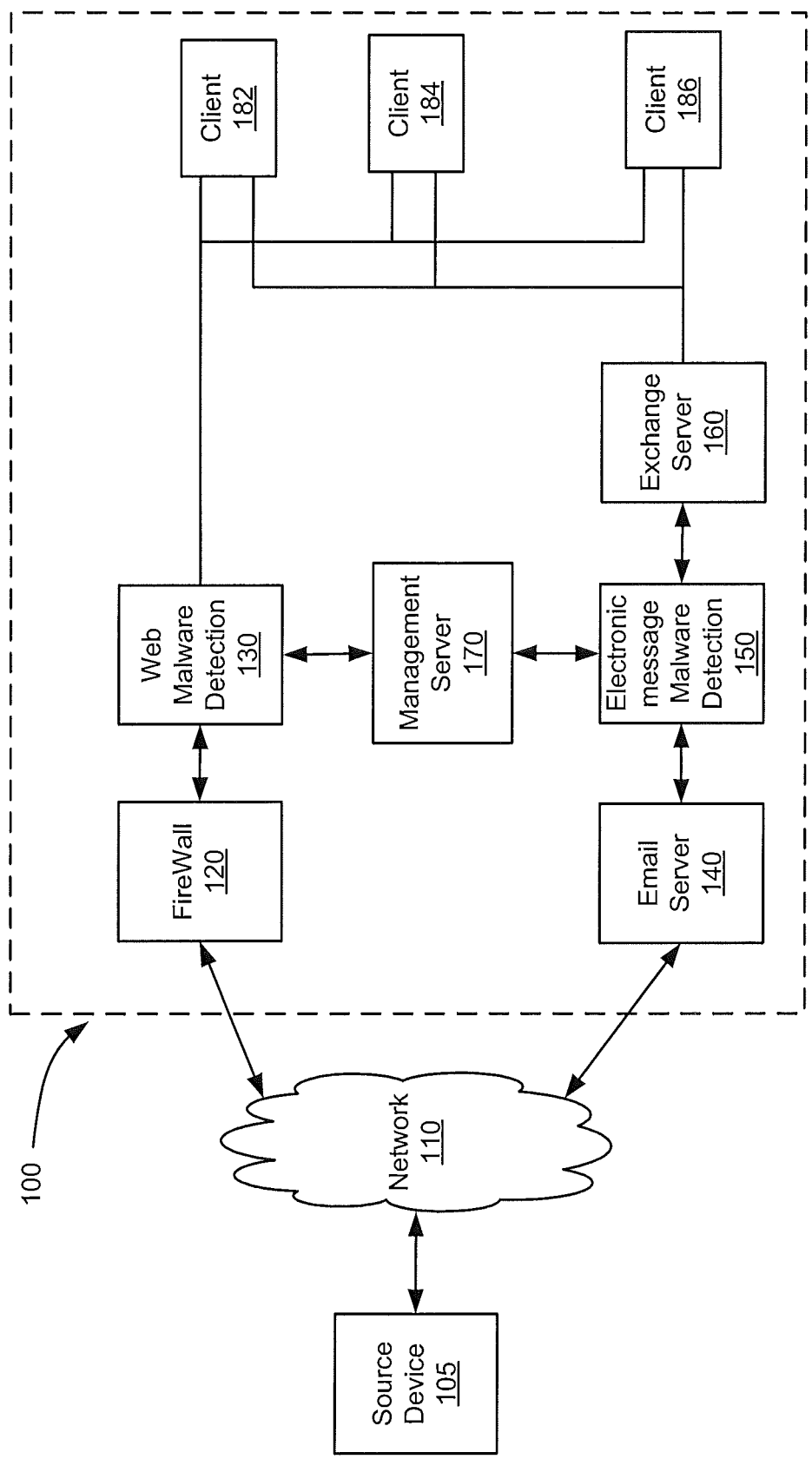
FIG. 1 is a block diagram of an exemplary system for detecting malicious electronic messages.

The present technology analyzes electronic messages for malware contained in the message. Systems that analyze electronic messages typically analyze attached files for malware in synthetic environments such as a virtual environment. Unlike prior systems, the present technology may analyze the content of an electronic message to detect malware in the message content. For example, the content may include a uniform resource locator (URL) address. The URL address may be analyzed to determine if the URL address is associated with malware. Additionally, the present technology may analyze attachments in a real operating system running in an instrumented virtual environment. In addition to analyzing the content within an email itself, the present technology may process attachments for emails that provide a location associated with malware. The attachments may include one or more files compatible with common applications, including Word, Excel and Powerpoint applications by Microsoft Corporation, of Redmond, Wash., and Adobe Reader application, by Adobe Systems Inc., of San Jose, Calif.

In some embodiments, the present technology may analyze an electronic message to detect a URL, identify whether the URL is suspicious, and analyze the suspicious URL to determine if it describes a location associated with malware. Determining if the URL is suspicious may include if comparing the URL to one or more lists of URLs. For example, the URL may be compared to a white list of acceptable URLS, a black list of malware URLs, and/or a list having a combination of URLs. If the URL is not found on any list, the URL is not determined to be malware and not determined to be acceptable, and therefore may be determined to be suspicious.

Analysis of a suspicious URL may include re-playing the suspicious URL in a virtual environment which simulates the intended computing device to receive the electronic message. Re-playing a URL may include executing the URL by a virtual component in the virtual environment to request content located from the URL address. Content is received by the virtual environment in a URL request response, the received content is loaded into the virtual environment, and executed while the virtual environment is monitored. If the re-played URL is determined to be malicious, the malicious URL is added to a black list which is updated throughout the computer system.

The electronic message content, for example a URL, may be identified as malicious by a first device or module that processes electronic messages to detect malware. Other first devices or modules in the system may process network traffic to detect malware. A central device or module may communicate with both the network traffic malware module and the electronic message malware module. In some embodiments, the central module may receive URLs detected to be malicious, may update a central URL blacklist based on the received URLs, and may transmit the updated URL blacklist to both the network traffic malware module and the electronic message malware module. This may cause a network malware module to examine more closely web traffic returning from requests to URLs passed in email, for example making it more likely that such web traffic was replayed in a virtual environment.

FIG. 1 is block diagram of an exemplary system for detecting malicious electronic messages. The system of FIG. 1 includes source device 105, network 110 and malware detection system 100. Malware detection system 100 includes firewall 120, web malware detection device 130, electronic message server 140, electronic message malware detection device 150, exchange server 160, management server 170, client device 182, client device 84 and client device 186. Though blocks within system 100 may be discussed herein as different devices, such as web malware detection 130 and electronic message malware detection 150, blocks of system 100 may be implemented as modules within a single device or combination of devices.

Source device 105 may transmit electronic messages and content page content, such as web page content, to malware detection system 100 over network 110. System 100 may receive network traffic content through firewall 120 and may receive electronic message content through electronic message server 140 via network 110.

Network 110 may transmit electronic message, content page, and other content between devices connected to network 110, including web malware detection system 130, electronic message malware detection system 150, and source device 105. Network 110 may include one or more private networks, public networks, LANs, WANs, intranets, the Internet, and a combination of these networks.

Firewall 120 may be a device that consists of hardware and/or software that detects and prevents unauthorized network traffic from being received by or sent by client devices 182, 184 and 186. Firewall 120 may communicate with network 110 and web malware detection system 130.

Web malware detection 130 may communicate with management server 170 and client devices 182-186. Web malware detection 130 may operate to intercept network traffic and analyze intercepted traffic to determine whether the traffic is malware. The intercepted traffic may be copied by web malware detection 130 and analyzed using heuristics and other techniques. The heuristics may be used to identify portions of the network traffic as suspicious. Portions of traffic not identified as suspicious are ignored and passed through web malware detection 130. The suspicious network traffic portions may be analyzed by replaying the traffic in a virtual environment. The replay may be monitored and used to identify malware content by web malware detection 130. A system for re-playing intercepted traffic in a virtual environment using virtual components is described in U.S. patent application Ser. No. 12/359,252, entitled "Detecting Malicious Network Content Using Virtual Environment Components", filed Jan. 23, 2009, the disclosure of which is incorporated herein by reference.

Electronic message server 140 may receive and send electronic messages between network 110 and electronic message malware detection 150.

Electronic message malware detection 150 may communicate with exchange server 160, management server 170, and email server 140, and may be implemented on one or more devices such a mail transfer agents (MTAs). Electronic message malware detection 150 may intercept electronic message traffic directed towards client devices 182-186. Electronic message malware detection 150 may include logic which analyzes electronic messages transmitted to and from electronic message 140 to identify malicious content within the electronic message. Identifying malware may include identifying an electronic message as suspicious, analyzing suspicious electronic messages to identify a malicious message, and communicating the malicious content to management server 170 to inform the remainder of system 100. Analyzing the suspicious electronic message may include replaying a portion of the electronic message in a virtual environment and monitoring the replay of the content. In some embodiments, content examined by electronic message malware detection 150 may include a URL detected within the body or header of an electronic message received by system 100.

Exchange server 160 may transfer mail between client devices 182-186 and electronic message malware detection 150. Management server 170 may receive malicious URL notifications, aggregate the received URLs, and update a black list maintained at management server 170. The malicious URL notification may be received from system 150 or system 130. Management server 170 may also transmit the black list of URLs to web malware detection systems and electronic message malware detection systems throughout system 100.

Clients 182, 184 and 186 may be any kind of device within a system 100 on which one or more users may execute programs to access network content such as a web page and transmit electronic messages such as an electronic message, instant message, or other electronic message.

Figure 2:
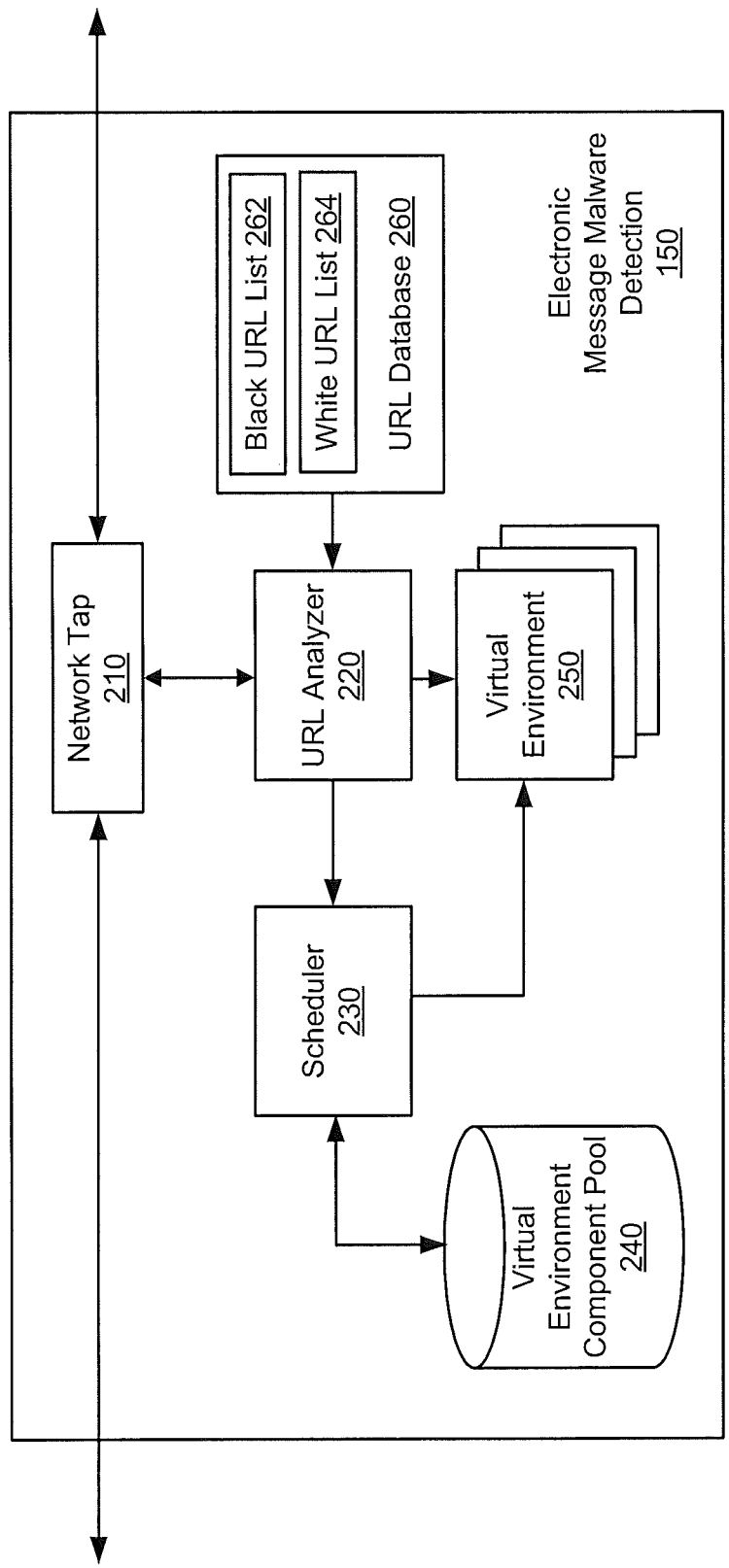
FIG. 2 is a block diagram of an exemplary e-mail malware detection module.

FIG. 2 is a block diagram of an exemplary electronic message malware detection system. The system of FIG. 2 includes network tap 210, URL analyzer 220, scheduler 230, virtual environment component pool 240, virtual environment 250 and URL database 260. Network tap 210 may intercept electronic messages such as electronic message and instant messages transmitted between electronic message server 140 and exchange server 160. Network tap 210 may make a copy of the electronic message to analyze within electronic message malware detection system 150. Though electronic messages may include email as well as other types of messages, email will be discussed herein as merely an example.

URL analyzer 220 may detect URLs within a detected electronic message. Detecting a URL may include parsing the header and the body of an electronic message to identify a URL within the electronic message. Upon detecting a URL within a message, URL analyzer determines if the URL is suspicious and initiates an analysis of any suspicious URL. A URL may be suspicious if it does not appear in a list of acceptable URLs (a white list) and does not appear in a list of malware URLs (black list).

Upon detecting a suspicious URL, URL analyzer 220 provides the URL to scheduler 230. Scheduler 230 receives suspicious URLs and retrieves virtual environment components from virtual environment component pool 240. The virtual environment components may include components intended to replicate the actual environment at a client device intended to receive the electronic message. For example, the virtual environments may include a virtual operating system, virtual applications, and a virtual network intended to replicate those associated with a particular client device intended to receive the message. Scheduler 230 then provides the URL and the retrieved virtual environment components to a virtual environment 250 in order to replay the URL within a virtual environment.

Virtual environment 250 receives the suspicious URL and virtual environment components and replays the URL within a virtual environment having the virtual components. Replaying the URL may be similar to performing a "click" operation on the suspicious URL. Upon performing a click on the URL, a request is sent to the URL for content, and the network server associated with the URL provides content and a response to the request. The content received in response to the request is then processed by the virtual environment and the environment is monitored to determine if any undesirable behavior occurs. If any undesirable behavior occurs in response to loading content associated with the URL, the URL is determined to be malware and added to a local black list by electronic message malware detection system 150. Undesirable behavior may unauthorized requests for data, sending or receiving data over a network, processing and/or storing data, changing a registry value, installing a file, executing a file, or other operations. The internal malware black list is transmitted to management server 170.

URL database 260 includes black URL list 262 and white URL list 264. URL analyzer may compare URLs detected in electronic messages to black URL list 262 to determine if there is a match. If there is a match, the URL is detected to be malware, and the electronic message may be blocked or the URL may be removed from the electronic message. If the URL is removed from the electronic message, an alert may be generated (e.g., within the message) indicating the URL has been removed and an administrator may be notified. If a detected URL matches a URL on the white URL list 264, the URL is determined to be acceptable and no further action is taken. If a detected URL does not match a URL on black URL list 262 or white URL list 264, the URL is identified as being suspicious and is processed in a virtual environment.

Figure 3:
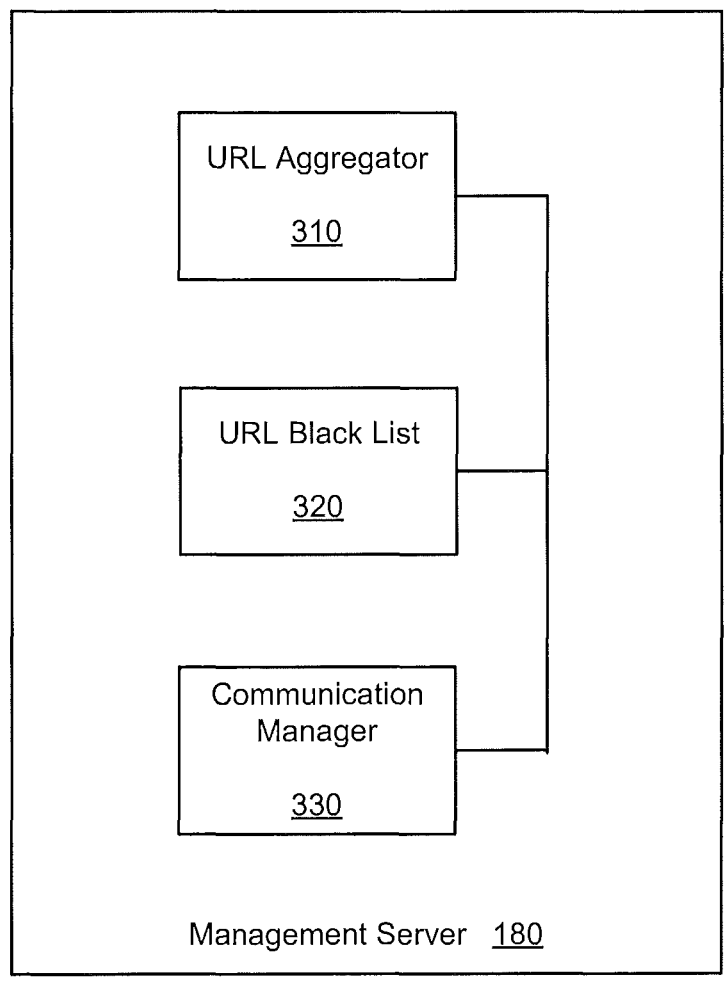
FIG. 3 is a block diagram of an exemplary management server.

FIG. 3 is a block diagram of an exemplary management server. Management server 170 of FIG. 3 includes URL aggregator 310, URL black list 320, and communication manager 330. URL aggregator 310 aggregates received URLs and updates and stores URL black list 320. URL black list 320 is a list of confirmed malicious URLs maintained by management server 170. Communication manager 330 may receive URLs from electronic message malware detection systems and web malware detection systems within system 100. Communication manager 330 may provide the URLs to URL aggregator 310 to aggregate the URLs and update URL black list 320 maintained on management server 170. Communication manager 330 may also send the current URL black list to malware detection systems within system 100.

Figure 4:
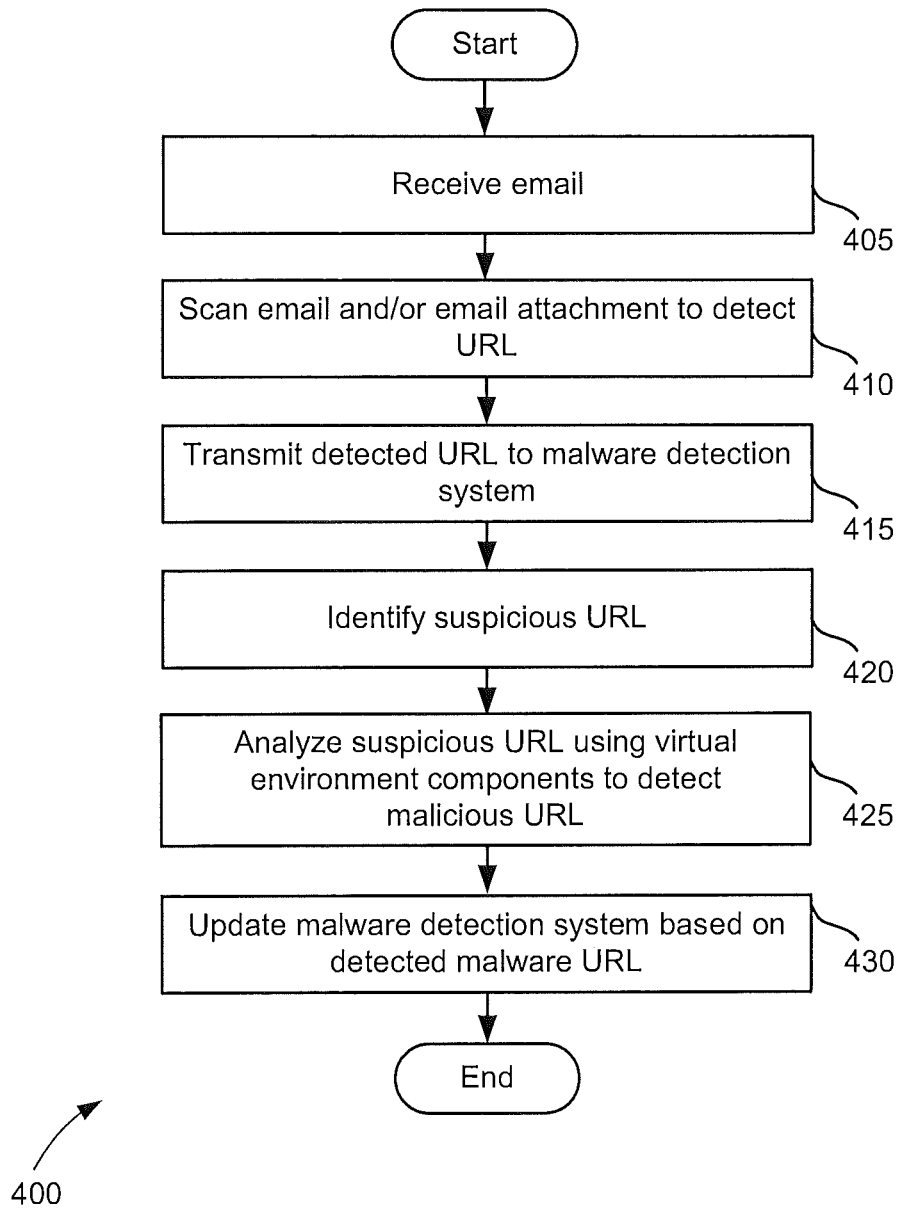
FIG. 4 is a flowchart of an exemplary method for detecting malicious electronic messages.

FIG. 4 is a flowchart of an exemplary method for detecting malicious electronic messages. Though FIG. 4 will be discussed in terms of an electronic message, other electronic messages, such as an instant message or other forms of communication, may be processed by the present technology.

An electronic message is received at step 405. The electronic message may be received by electronic message malware detection system 150 via electronic message server 140. The electronic message and/or an attachment to the message may be scanned to detect a URL at step 410. The electronic message may be scanned by a URL analyzer module to detect a URL in the electronic message header, body or other portion of the electronic message. The attachment may be scanned to detect a URL within the attachment. For example, if the attachment is a word processor or spreadsheet document, the attachment may be scanned to detect a URL in text of the word processor document or within a cell of the spreadsheet.

Detected URLs may be transmitted to a malware detection system at step 415. The malware detection system may be contained locally on electronic message malware detection system 150 or outside detection module 150. For example, electronic message malware detection system 150 may transmit detected URLs to web malware detection system 130 to process the URL to determine if the URL is malicious. In some embodiments, a URL is simply stored locally at electronic message malware detection system 150 at step 415 for further processing.

A suspicious URL may be identified from the detected URLs at step 420. A URL may be identified as suspicious if the URL does not match a black list of URLs or a white list of URLs maintained at electronic message malware detection system 150 (or accessible by detection module 150). Identifying suspicious URLs is discussed in more detail below with respect to the method of FIG. 5.

Suspicious URLs are analyzed using virtual environment components to detect a malicious URL at step 425. Analyzing a suspicious URL may include selecting virtual components such as a virtual operating system, virtual applications, and virtual network, populating and configuring a virtual environment with the virtual components, and processing the URL within the virtual environment. Processing the URL within the environment may include replaying the URL within the virtual environment by performing a "click" operation on the URL. The URL may be identified as malicious if content received in response to the click operation on the URL results in an undesirable behavior within the virtual environment. An undesirable behavior may include attempts to change an operating system setting or configuration, execute an executable file within the virtual environment, transmit undesirable data, or other actions. In some embodiments, an undesirable behavior may include an unexpected behavior. If no undesirable behavior occurs in response to clicking the URL, the URL is determined to be acceptable and is added to a white list.

A malware detection system may be updated based on the detected malware URL at step 430. Updating may include communicating the malicious URL to other parts of a system. For example, electronic message malware detection system 150 may communicate one or more malicious URLs to management server 170, and server 170 may communicate the URL via an updated black list to web malware detection systems and electronic message malware detection systems within system 100. Updating a malware detection system is described in more detail below with respect to the method of FIG. 7.

One or more factors may affect how a URL is determined to be suspicious and/or processed to determine if it is associated with malware. In an embodiment, any URL detected in an email may be transmitted by electronic message malware detection 150 to web malware detection 130. Upon detecting that content is being requested from the URL, for example in response to a user selection or "click" on the URL, the web malware detection 130 may increase the priority of the detected URL such that the URL is analyzed to determine if is suspicious and/or associated with malware. In this embodiment, the URL may not be processed by the web malware detection 130 until it is determined that content is actually being requested from the URL.

Figure 5:
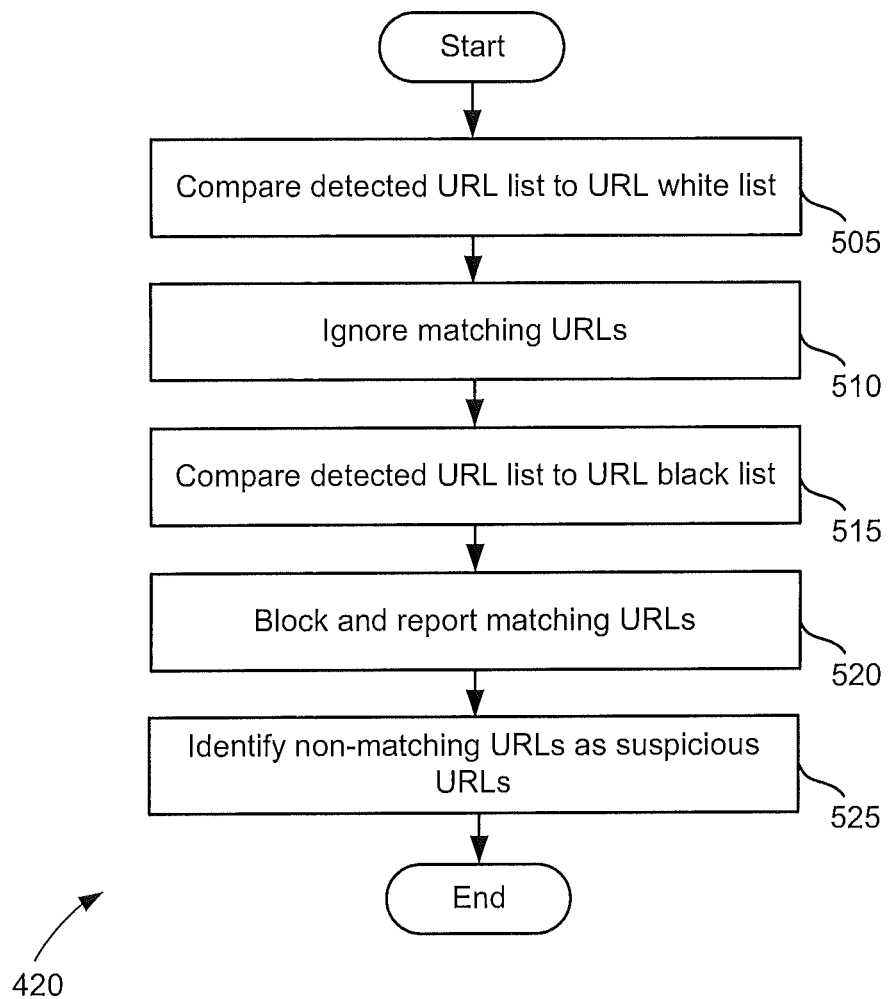
FIG. 5 is a flowchart of an exemplary method for identifying a suspicious URL.

A large number of URLs may be detected by web malware detection 130 in network traffic travelling through firewall 120. One or more detected URLs detected by web malware detection 130 may be assigned a priority for analysis. Higher prioritized URLs are analyzed to determine if they are suspicious or associated with malware before lower priority URLs. In some embodiments, URLs detected in email are provided a lower priority than those detected as part of network traffic by web malware detection 130. The priority of a URL may be increased once it is determined to be present in both an email and network traffic (i.e., detected by both electronic message malware detection 150 and web malware detection 130, in any order). The level of priority increase may depend on the resources available to process URLs. For example, the level of priority increase may be less if there are a small number of virtual environments or components available to process a suspicious URL. If there is a large number of virtual environments and/or virtual components available to process a URL, there may be a large level of priority increase. Hence, the priority of URLS to be processed by may adjusted in such a way to avoid degradation of the normal functioning of web malware detection 130 under heavy load, while allowing thorough examination of all email URLs where load permits FIG. 5 is a flowchart of an exemplary method for identifying a suspicious URL. In some embodiments, the method of FIG. 5 provides more detail for step 420 in the method of FIG. 4. Each detected URL in an electronic message is compared to a URL white list at step 505. The URL white list may be maintained on electronic message malware detection system 150 and may include a list of acceptable URLs or URL domains. URLs that match the URL white list are ignored at step 510. The URLs that match the white list are determined to not be malicious and therefore are allowed to pass through to their intended client device.

Detected URLs which are not on the white list are then compared to the URL black list at step 515. URLs on the black list are known to be malicious and should not be passed through to a user associated with a client device. If a detected URL matches a URL on the black list, the URL is blocked and reported at step 520, and thereby prevented from being provided to the recipient client device. A URL may be prevented from delivery by either blocking transmission of the entire electronic message, removing the URL from the electronic message message, or in some other manner. URLs that do not match a URL on the white list or a URL on the black list are identified as suspicious URLs at step 526. The remaining URLs are characterized as suspicious because it is unknown whether they are acceptable or malicious.

Figure 6:
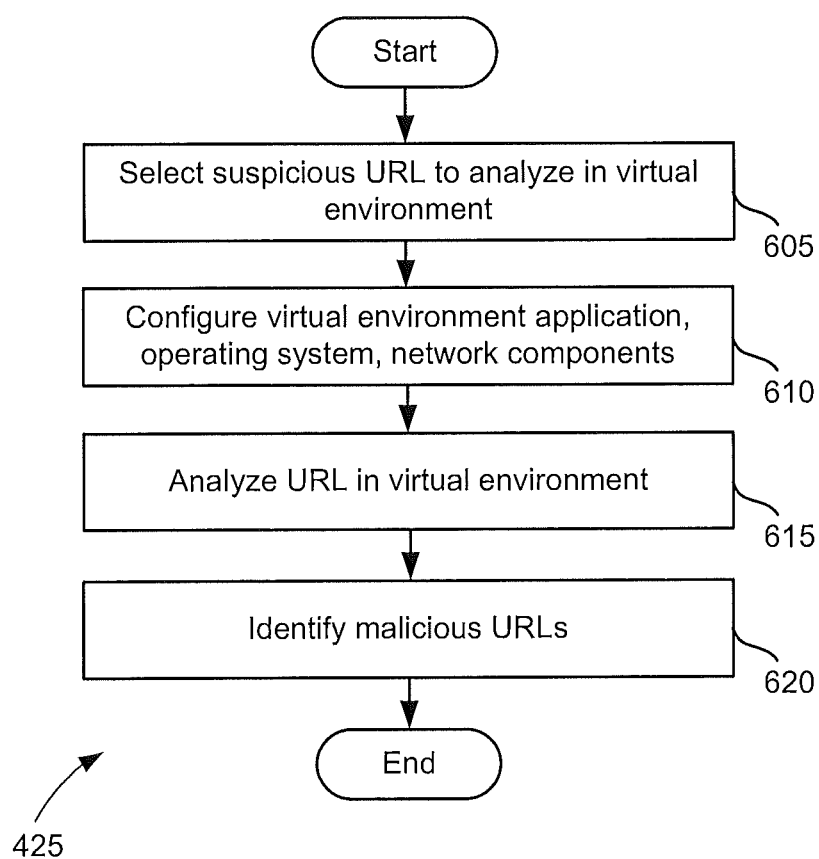
FIG. 6 is a flowchart of an exemplary method for identifying suspicious URLs.

FIG. 6 is a flowchart of an exemplary method for identifying malicious URLs. The method of FIG. 6 provides more detail for step 525 of the method of FIG. 5. First, a suspicious URL is selected to analyze in a virtual environment at step 605. Some URLs may be weighted with a higher priority to analyze. The higher priority URLs may be placed in a higher priority position in an analysis queue as opposed to lower priority URLs. A priority may be associated with a URL by a user, based on learning performed by the present system, or in some other manner. The priority may be associated with the URL domain, keywords in the URL, positioning within the electronic message for the URL, or other factors.

The present system may configure a virtual environment application, operating system, and network components at step 610. These virtual components may be retrieved from a component pool by a scheduler. A URL may be analyzed in the virtual environment configured with the virtual components at step 615. Analyzing the URL may include replaying the URL by performing a "click" operation on the URL within the virtual environment. Upon performing the click operation, an application may send a content request message to the URL and receive a response message in response to the URL request. For example, a network browser may be executed to provide the content received in response to the URL response received by the application. Actions performed within the virtual environment in response to receiving the URL content may be recorded and analyzed to determine if the URL is malicious.

A malicious URL may be identified at step 620. An identification as a malicious URL may be based on actions or changes that occur when a suspicious URL is replayed in the virtual environment. Actions that may indicate a malicious URL include changing an operating system configuration, performing requests or trying to install or execute file, or other actions performed in response to retrieving content from the URL location.

Figure 7:
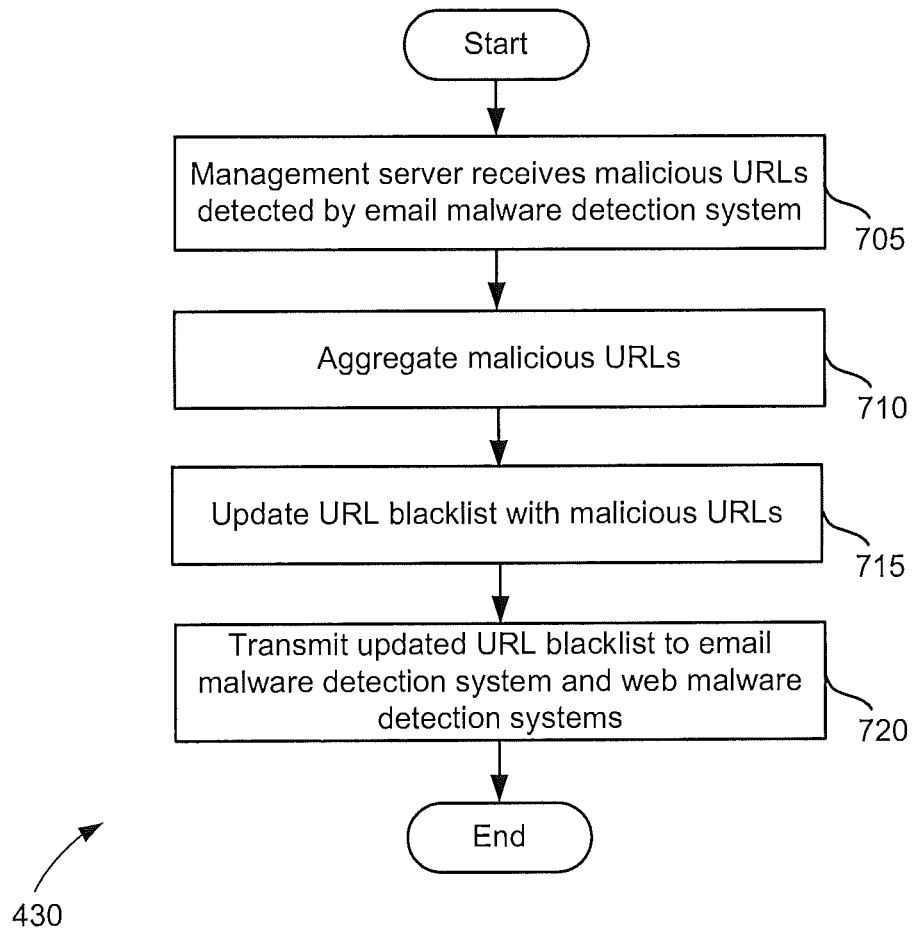
FIG. 7 is a flowchart of an exemplary method for updating a malware detection system.

FIG. 7 is a flowchart of an exemplary method for updating a malware detection system. The method of FIG. 7 provides more detail for step 430 of the method of FIG. 4. First, a management server receives a malicious URL detected by electronic message malware detection system at step 705. The malicious URLs are then aggregated by the management server at step 710. A URL black list is updated with the aggregated malicious URLs at step 715. The management server may then transmit the updated URL black list to electronic message malware detection systems and web malware detection systems at step 720. The transmission of the updated URL black list may be performed upon request, periodically, or upon occurrence of a particular event, such as when a URL black list has undergone a threshold number of changes.

In some applications of this technology, it may not be desired to fetch content from every URL seen in incoming electronic messages where such "clicks" may have undesired side effects on applications using the web (HTTP) as a communication protocol. Therefore, an alternative method can be used in such cases, in which all URLs received in electronic messages are forwarded to a web malware detection system, and are used to raise the probability of examining any particular piece of web content if it has previously been seen in electronic messages (e.g., email). Thus "targeted spear phishing" attacks in which malicious URLs are sent to particular email addresses in an effort to induce the recipient to click on the link will be examined by the malware detection system only in the event that the recipient does actually so click.

Since many URLs seen in electronic messages are also accessed via the web, the present invention also includes a dynamic method for setting the "email priority boost" used to enhance the priority of inspecting web content by noting the fraction of all the efforts of the web malware detection system devoted to examining URLs previously seen by the electronic message malware detection system. This "email priority boost" can be regulated to target a particular fraction of the virtual execution environments available on the web malware detection system, to avoid overloading the latter and causing loss of other web detection functionality, while still allowing complete examination of urls seen in electronic messages where system load allows.

Figure 8:
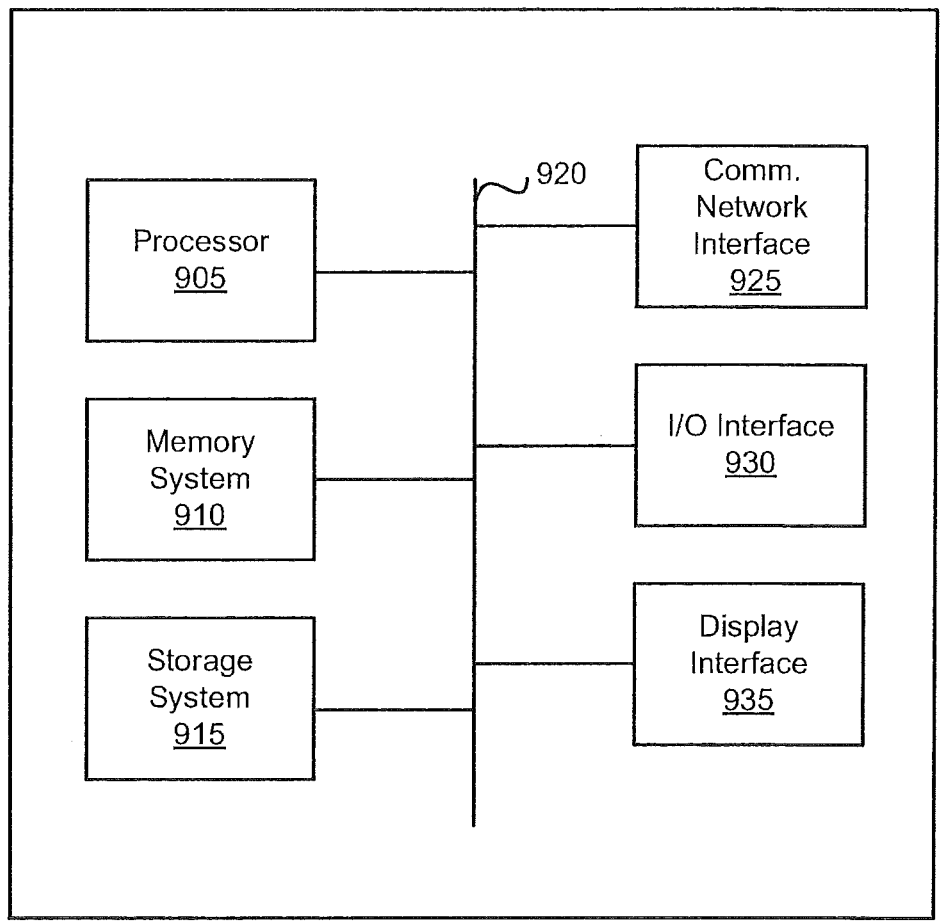
FIG. 8 is a block diagram of an exemplary computing device.

FIG. 8 is a block diagram of an exemplary computing device. The computing device of FIG. 8 may be used to implement one or more devices in the system 100 of FIG. 1, including but not limited to firewall 120, web malware detection 130, e-mail server 140, e-mail malware detection 150, management server 170, exchange server 160, or clients 182-186. FIG. 8 is a block diagram of an exemplary malicious network content detection device. In some embodiments, the method of FIG. 8 provides more detail for malicious (network content) detection system 150 of FIG. 1. Malicious network content detection system 150 comprises at least one or more processors 905, memory systems 910, and storage systems 910, each of which can be communicatively coupled with data bus 820. In some embodiments, data bus 920 may be implemented as one or more data buses. Malicious network content detection system 100 may also comprise communication network interface 925, input/output (I/O) interface 930, and display interface 935. Communication network interface 925 may be communicatively coupled with network 110 of FIG. 1 via communication medium 940. In some embodiments, malicious network content detection system 100 may be communicatively coupled with a network tap, such as network tap 115, which in turn may be communicatively coupled with network 110. Bus 920 provides communications between communications network interface 825, processor 905, memory system 910, storage system 915, I/O interface 930, and display interface 935.

Communications network interface 925 may communicate with other digital devices (not shown) via communications medium 940. Processor 905 executes instructions which may be stored on a processor-readable storage medium. Memory system 910 may store data permanently or temporarily. Some examples of memory system 910 include RAM and ROM. Storage system 815 also permanently or temporarily stores data. Some examples of storage system 915 are hard discs and disc drives. I/O interface 930 may include any device that can receive input and provide output to a user. I/O interface 930 may include, but is not limited to, a keyboard, a mouse, a touch screen, a keypad, a biosensor, a compact disc (CD) drive, a digital video disc (DVD) drive, an optical disk drive, or a floppy disk drive. Display interface 935 may include an interface configured to support a display, monitor, or screen. In some embodiments, malicious network content detection system 150 comprises a graphical user interface to be displayed to a user over a monitor in order to allow the user to control malicious network content detection system 150.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed:

1. A computer implemented method for detecting malicious network content by a malware detection system including a hardware processor and a memory, comprising:
   receiving, by the malware detection system, an electronic email message;
   analyzing, by the malware detection system, the electronic email message to detect a uniform resource locator (URL) within message content of the electronic email message;
   determining whether the URL within the message content is suspicious;
   in response to a determination that the URL is suspicious, processing the suspicious URL detected within the message content of the electronic email message, wherein the processing of the suspicious URL comprises analyzing, within a virtual environment, content received in response to a request for content; and
   identifying the suspicious URL as malicious based on results of the analyzing of the suspicious URL in the virtual environment.

2. The method of claim 1, further comprising:
configuring a virtual environment component within the virtual environment to process suspicious network content, the network content comprising web content including the suspicious URL, the virtual environment being configured within a web malware detection system being part of the malware detection system;
processing the suspicious network content using the virtual environment component within the virtual environment; and
identifying the suspicious network content as malicious network content based on at least one behavior of the virtual environment component.

3. The method of claim 2, wherein the suspicious network content includes a file attached to the electronic email message, the virtual environment component including an application configured to process the file.

4. The method of claim 1, further comprising:
comparing the URL to a first list of URLs that are either all associated with malware or all known to be not associated with malware; and
identifying the URL as suspicious if the URL is not in the first list of URLs.

5. The method of claim 4, further comprising:
transmitting one or more malicious URLs to a remote device that is configured to receive the one or more malicious URLs and consolidate stored malicious URLs; and
receiving an updated list of URLs associated with the malicious URLs.

6. The method of claim 1 further comprising monitoring changes to the virtual environment of the malware detection system, the suspicious URL detected within the message content of the electronic email message identified as malicious based on detected improper changes to the virtual environment.

7. The method of claim 1, wherein the virtual environment comprises a virtual environment component that is intended to replicate a client device intended to receive the electronic mail message.

8. The method of claim 7, wherein prior to determining whether the detected URL is suspicious, assigning a priority to the URL that is used, at least in part, in establishing an order in which URLs, including the URL, are analyzed to determine whether the URLs are suspicious.

9. The method of claim 8, wherein the detected URL is prioritized at least based on (i) a domain of the URL or (ii) keywords in the detected URL.

10. The method of claim 8, wherein the detected URL is prioritized at least based on positioning of the detected URL within an electronic message.

11. The method of claim 1, wherein the virtual environment includes a network browser application being executed to receive content associated with a response to a request message routed to the URL.

12. The method of claim 1, wherein the virtual environment further includes a virtual operating system and one or more virtual applications including the network browser.

13. The method of claim 1, wherein the processing of the suspicious URL comprises analyzing a suspicious URL may include selecting one or more virtual components including an operating system and one or more applications, configuring the virtual environment with the virtual components, and processing the suspicious URL within the virtual environment.

14. The method of claim 1, wherein the virtual environment simulates operations of a computing device intended to receive the electronic email message.

15. The method of claim 1, wherein the virtual environment includes an operating system and one or more applications.

16. A computer implemented method for detecting one or more malicious uniform resource locators (URLs) contained within electronic messages, comprising:
determining whether an URL is suspicious by at least (i) comparing, by a web malware detection system, the URL to a white list of acceptable URLs and a black list of malicious URLs, and (iii) determining that the URL is suspicious when not found in either the white list or the black list;
analyzing the URL when the URL is determined to be suspicious by at least executing an application within a virtual environment of the web malware detection system, loading the web content associated with the suspicious URL into the virtual environment, processing the received web content associated with the suspicious URL within the virtual environment, and monitoring for an undesirable behavior during the processing of the received web content; and
identifying, as a malicious URL, the suspicious URL based on the undesirable behavior monitored within the virtual environment.

17. The method of claim 16, wherein the determining whether the URL is suspicious includes providing the URL to the web malware detection system, the web malware detection system being different than an electronic message malware detection system.

18. The method of claim 17, wherein prior to executing the web content associated with the URL, the method further comprising:
receiving an electronic message by the electronic message malware detection system;
analyzing, by the electronic message malware detection system, the electronic message to detect the URL within message content of the electronic message;
sending a request message for web content associated with the URL and, in response, receiving the web content.

19. The method of claim 16, wherein upon determining that the URL compares to a malicious URL within the black list, preventing delivery of the malicious URL included in an electronic message to a recipient client device and precluding further URL analysis on the URL within the virtual environment.

20. The method of claim 16, further comprising transmitting the malicious URL to a management server, the management server being configured to receive the one or more malicious URL, aggregate received URLs including the malicious URL, and transmit an updated black list of malicious URLs for local storage on an electronic message malware detection system and the web malware detection system.

21. The method of claim 16, wherein the executing of the suspicious URL further comprises:
configuring the application being a network browser in the virtual environment; and
sending a content request message to an address associated with the suspicious URL by the network browser in the virtual environment to receive and load the web content associated with the suspicious URL into the virtual environment.

22. The method of claim 16, wherein the virtual environment includes a network browser application being executed to receive content associated with a response to a request message routed to the URL.

23. The method of claim 16, wherein the virtual environment further includes a virtual operating system and one or more virtual applications including the network browser.

24. The method of claim 16, wherein the virtual environment simulates operations of a computing device intended to receive the electronic messages.

25. The method of claim 16, wherein the virtual environment includes an operating system and one or more applications.

26. A system for detecting one or more malicious uniform resource locators (URLs) contained within electronic messages malicious network content, comprising:
an electronic message malware detection system comprising a processor and configured to:
receive an electronic message,
analyze the electronic message to detect a URL within message content of the electronic message, and
provide the URL to a web malware detection system; and
the web malware detection system coupled with the electronic message malware detection system and different than the electronic message malware detection system, the web malware detection system being configured to:
send a request message for web content associated with the URL and, in response, receiving the web content, and
execute the web content associated with the URL within a virtual environment to determine whether one or more undesirable behaviors have occurred,
wherein the web malware detection system determines whether the URL is suspicious by (i) comparing the URL to a white list of acceptable URLs and a black list of malicious URLs, and (ii) determining that the URL is suspicious when not found in either the white list or the black list,
wherein the web malware detection system being further configured to identify, as a malicious URL, the suspicious URL based on the occurrence of the one or more undesirable behaviors.

27. The system of claim 26, wherein the web malware detection system, upon determining that the URL compares to a malicious URL within the black list, prevents delivery of the malicious URL included in the electronic message to a recipient client device and precludes analysis of the URL within the virtual environment.

28. The system of claim 26,
wherein the web malware detection system comprises a virtual environment component within the virtual environment that provides the application configured to process suspicious network content comprising the web content corresponding to the suspicious URL, the virtual environment configured within the web malware detection system; and
wherein the web malware detection system is further configured to process the suspicious network content using the virtual environment component within the virtual environment, and to identify the suspicious network content as malicious network content based on a behavior of the virtual environment component.

29. The system of claim 28, wherein the web malware detection system further comprises monitoring changes to the virtual environment by an agent, the suspicious URL identified as malicious based on detected improper changes to the virtual environment.

30. The system of claim 26, wherein the message content includes a header portion and a body portion of, and an attachment to the electronic message.

31. The system of claim 26, wherein the virtual environment simulates operations of a computing device intended to receive the electronic message.

32. The system of claim 26, wherein the virtual environment includes an operating system and one or more applications.

33. A method for detecting malicious network content, comprising:
receiving a uniform resource locator (URL);
determining whether the URL is suspicious based, at least in part, on accessing and analyzing the detected URL in accordance with (i) a plurality of confirmed malicious URLs maintained as part of a black list stored remotely from the system or (ii) a plurality of accessible URLs maintained as part of a white list;
in response to a determination that the detected URL is suspicious, processing the suspicious URL by at least analyzing content, received in response to a request based on the suspicious URL, within a virtual environment, wherein the virtual environment includes a network browser application being executed to receive content associated with a response to a request message routed to the URL; and
identifying the suspicious URL as malicious based on results of the processing of the suspicious URL in the virtual environment.

34. The method of claim 33, wherein the virtual environment further includes a virtual operating system and one or more virtual applications including the network browser application.

35. The method of claim 33, wherein the black list is maintained at a management server remotely located from the system.

36. The method of claim 33 further comprising monitoring for an occurrence of any undesirable behavior by the virtual environment in response to loading content associated with the suspicious URL.

37. The method of claim 33, wherein the virtual environment simulates operations of a computing device intended to receive the URL.

38. The method of claim 33, wherein the virtual environment includes an operating system and one or more applications including the network browser application.

* * * * *